United States Patent [19]
Brunner

[11] 3,992,133
[45] Nov. 16, 1976

[54] PRESSURE FLUID PUMP
[75] Inventor: Rudolf Brunner, Baldham, Germany
[73] Assignee: Heilmeier and Weinlein, Fabrik fur Oel-Hydraulik, a KG, Munich, Germany
[22] Filed: Mar. 19, 1975
[21] Appl. No.: 559,690

[30] Foreign Application Priority Data
  Mar. 21, 1974 Germany............................ 2413691

[52] U.S. Cl.............................. 417/366; 417/371; 417/372; 310/54
[51] Int. Cl.².......................................... F04B 39/02
[58] Field of Search .......... 417/371, 372, 366, 313, 417/369, 370, 902; 310/54, 57, 87; 60/DIG. 10, 456, 477, 478, 360

[56] References Cited
UNITED STATES PATENTS

| | | | |
|---|---|---|---|
| 2,040,403 | 5/1936 | Persons | 60/477 |
| 2,312,514 | 3/1974 | Zimmerer | 417/902 |
| 2,631,431 | 3/1953 | Grebe | 60/477 |
| 2,825,286 | 3/1958 | White | 417/371 |
| 3,618,337 | 11/1971 | Mount | 417/366 |
| 3,719,429 | 3/1973 | Rule | 417/360 |
| 3,897,179 | 7/1975 | Fussner | 417/366 |
| 3,922,114 | 11/1975 | Hamilton et al. | 417/366 |

FOREIGN PATENTS OR APPLICATIONS
1,258,692   1/1968   Germany ............................ 60/477

*Primary Examiner*—C. J. Husar
*Attorney, Agent, or Firm*—Albert C. Johnston

[57] ABSTRACT

A pressure oil or hydraulic fluid pump is provided wherein a container holding a supply of the liquid to be pumped also contains the fluid pump assembly and houses an electric motor driving the pump assembly. The container is filled or partially filled with the liquid and has the stator of the electric motor supported in it so that the liquid flows directly around and through the motor while the pump is operating.

17 Claims, 4 Drawing Figures

PRESSURE FLUID PUMP

The invention relates to a pressure oil or hydraulic fluid pump.

A large number of various kinds of pressure oil or hydraulic fluid pumps are known. When a very high hydraulic pressure is required, radial piston pumps are used. When a high throughput is required, multiple-compartmented pumps, known as vane pumps, are used. Screw pumps and gear pumps are other conventional pressure pumps also known in the art. The invention relates to all such types of pressure oil or hydraulic fluid pumps.

In conventional pressure oil or hydraulic fluid pumps, such as single-row radial piston pumps, which are driven by electric motors, the pump assembly and the electric motor are produced as separate units and connected to one another at mating flanges. Usually the electric motors are obtained in a finished state from special electric motor producers by the firm building the pumps. The space required and also the material costs are quite considerable. Special measures also are required in order to cool the electric motor, for example by providing special air cooling. In addition, the problem of sound insulation at the electric motor also has to be dealt with.

In order to obviate the aforementioned difficulties without requiring additional expenses for cooling means and satisfactory sound insulation, pressure oil pumps of the type specified are already known which operate with so-called submerged motors. With this known arrangement, an oil supply container is filled with the pressureless oil to a relatively high level, or it may be commpletely filled, and an assembly comprising the motor with the pump connected to it at mating flanges is suspended freely in the pressure oil Compare, for example, German specification DAS 1,938,813 or U.S. Pat. No. 3,689,203. It is also known, as shown, for instance, in U.S. Pat. No. 2,825,286 to provide a motor housing which is completely independent of the oil container and has recesses therein such that the oil in the oil container can act directly on and thus cool the active portions of the electric motor.

By the submerged motor arrangement noted above, where the entire pressure oil pump assembly comprising an oil pump with an electric motor connected to it is completely embedded in oil, the cooling and noise problems are overcome in a relatively satisfactory manner. The production costs, however, are still quite considerable, and likewise the space required, since the oil supply container has to surround the suspended pump and motor assembly with a spacing therefrom on every side.

Therefore, the present invention has as its object to provide a pressure fluid pump which does not require much space, and which involves low production costs.

It is another object of the invention to provide an economical pressure fluid pump assembly by which highly efficient cooling of the motor thereof is assured.

According to the invention, the provision of a special motor housing is obviated by using the oil supply container directly as the motor housing. The space required is very modest. For the best possible cooling effect, the oil container and the motor housed in it are formed so that the oil flows around and through the electric motor directly instead of only partly against it.

According to a particularly simple embodiment of the invention, the stator of the electric motor is held in spaced relation to the encompassing wall of the oil supply container by ribs which extend inwardly from that wall to provide spaces between the ribs for the oil circulation, with the stator force-fitted into a holding ring joined to the ribs. Alternatively, a ring holding the stator of the motor may be secured directly to the encompassing wall of the motor-housing portion of the oil supply container, with that wall given a polygonal configuration so that the oil will circulate through corner regions of the container. A substantially square cross-sectional configuration of the container wall is particularly useful, as it enables a minimum rectangular container outline to serve for a stator having the usual circular outline.

The above-mentioned and other objects, features and advantages of the invention will be further evident from the following detailed description and the accompanying diagrammatic drawings of a preferred embodiment of the invention, in which the pump utilized is a single-row radial piston oil pump.

Figure 2:
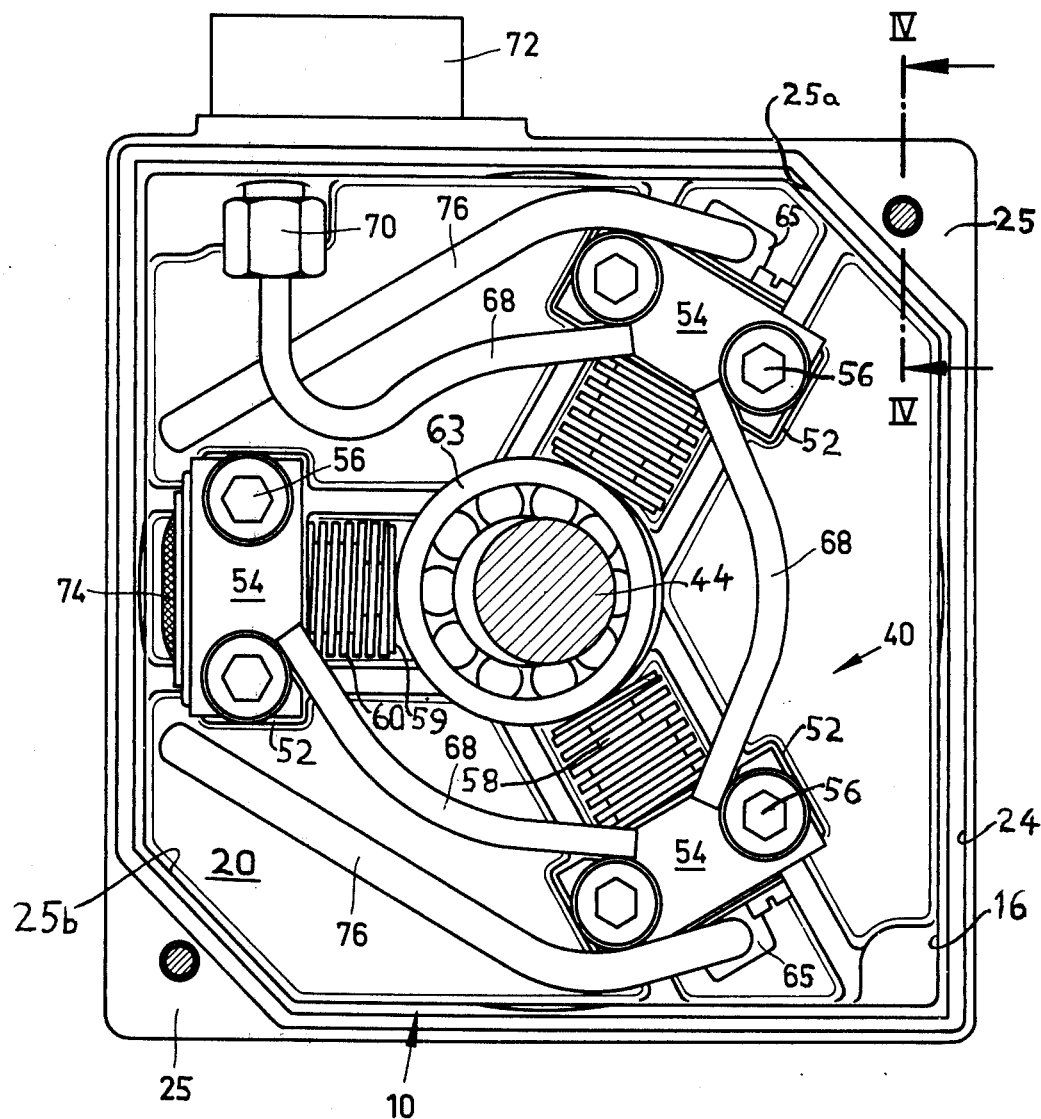
FIG. 2 is a plan view of the lower half of the pressure oil pump according to FIG. 1, with the upper half removed.
Figure 4:
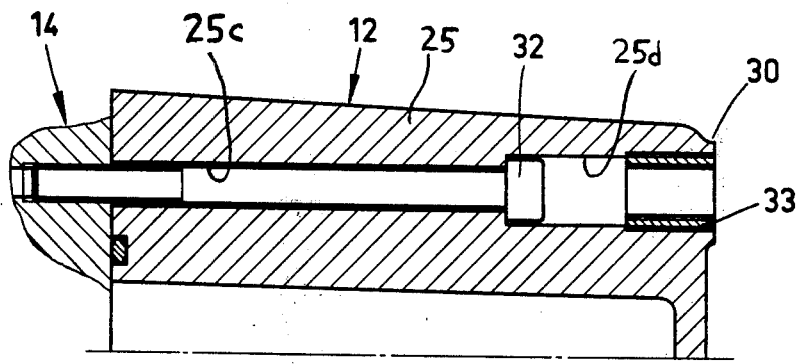
FIG. 4 is a fragmentary cross-section taken on the line IV—IV of FIG. 2.

The illustrated pressure oil pump comprises an oil supply container which is given the general reference numeral 10 and consists of a cup-shaped lower shell 12 and a mating cup-shaped upper shell 14. These shells are placed against one another at their confronting edges, or mating end faces, where they are centered relatively to one another by a step 16 and sealed to one another by a sealing ring 18. The upper shell 14 is slightly longer in the axial direction than the lower shell. Both shells have side walls 24 that extend slightly obliquely outwards towards their mating end faces from their respective end walls 20 and 22, which form substantially flat bottom and top walls of the oil supply container. The side walls 24 define a substantially square oil supply container which, as shown in FIG. 2, is provided at two opposite corners with thickened portion 25 presenting bevelled wall surfaces 25a and 25b above the bottom wall 20. In the regions of the corners at 25 and also at the two other corners the bottom wall is provided with feet 30 upon which the container can stand in upright position. As shown in FIG. 4, each of the thickened corner portions 25 has a bore 15c extending upwardly it and into the mating corner portion of the upper shell 14, and a headed screw 32 extending through each of these bores holds the two shells fixed tightly together. An enlarged region 25d of each screw bore, which receives the head of the screw 32, can be fitted with a screw-threaded sleeve 33, thus enabling the entire pressure oil pump to be fastened by screws onto a suitable base.

Figure 3:
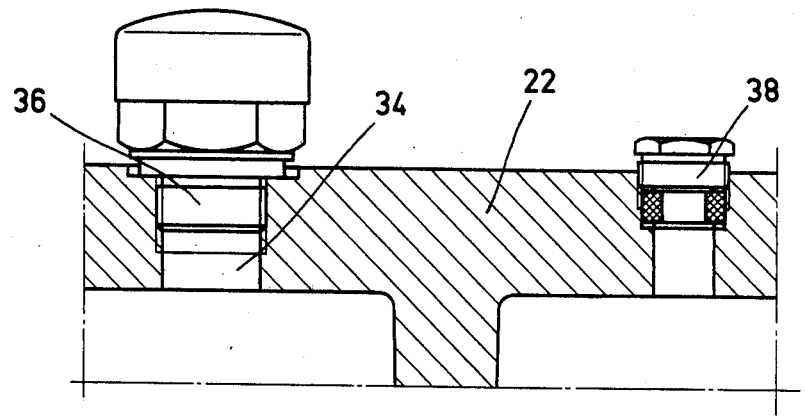
FIG. 3 is a fragmentary cross-section through part of the cover of the pressure oil pump shown in FIG. 1, taken in a plane offset relatively to the drawing plane of FIG. 1.

The top wall 22 of the upper shell 14 is provided with an oil filling aperture 34 into which an air filter 36 is screwed, as shown in FIG. 3. An oil-tight electrical cable passage 38 is also provided in the top wall 22.

In the lower shell 12 there is arranged and supported a single-row, three-arm, star-shaped radial piston pump 40, and an electric motor 42 is arranged and supported in the upper shell 24 which at the same time serves as the housing of the motor.

Alternatively, the oil supply container may comprise a one-piece side wall having two end enclosures at least one of which constitutes a detachable cover sealed to the side wall. In such an arrangement, the electric motor is supported by the side wall and the pump assembly is supported by the side wall or by a cover of the container.

The electric motor 42 is connected electrically with a current source by a cable (not shown) which extends into the oil supply container through the oil-tight passage 38. The container is kept at least partly filled with oil which it receives through the oil filling aperture 34. The oil in the container forms both an oil supply for the radial piston pump 40 and a bath of coolant for the electric motor 42, being circulated directly around and through the electric motor as will be explained in further detail hereinafter.

The electric motor 42 and the radial pump 40 have a common one-piece driving shaft 44 which at its upper end 46 is mounted in a radial bearing 51 supported on the inner side of the top wall 22 and at its lower end 48 is mounted in a thrust ball bearing unit 50 supported on the bottom wall 20. The lower bearing 50 is held above the bottom wall 20 by a central sleeve-shaped extension 21 thereon. The upper radial bearing 51 may comprise a simple bearing sleeve held in a sleeve-shaped central extension 23 on the top wall of the oil supply container. The driving shaft 44 thus is mounted for rotation about the vertical axis of the oil supply container.

The pump 40 comprises three oil pumping piston and cylinder units 54 which are spaced apart at uniform angular distances about and are positioned raidally with respect to the lower end of the driving shaft 44. These units are supported above the bottom wall 20 of the oil supply container, on seats 52 which protrude upwardly from that wall and to which the respective pumping units are secured by screws 56.

The piston and cylinder units 54 each have a piston 58 which is constantly biased in the direction towards the driving shaft 44 by a spring 60 compressed between the housing of the cylinder and a ring 59 on the piston. The driving shaft 44 has an eccentric lower end portion 61 on which is fitted the inner ring 62 of a radial ball bearing unit 64, the outer ring 63 of which is engaged by the pistons 58 of the three pumping units 54. The inner bearing ring 62 thus constitutes an axially offset cam which acts through the bearing balls and ring 63 in opposition to the force of the compression springs 60, and which drives the three pistons in a time phased cycle when the driving shaft 44 is rotated.

Each of the piston and cylinder units 54 draws oil from the oil supply in the container by way of a suction or inlet valve arranged at 65 or 74 opposite the outer end face of the piston 58, and delivers the oil under pressure through an outlet valve 66 which is arranged at a side of piston and cylinder unit 54, in this case at the top thereof. All three outlet valves 66 are connected one to another by high pressure conduits 68, one of which extends from the third unit 54 to a common pressure outlet 70 through which the oil under pressure passes further into a pressure oil connection 72 provided outside the portion of the container housing the pressure oil pump.

In order to enable operation of the radial piston pump not only in the illustrated upright position but also if it is laid on one of its sides, the inlet valve of one of the piston and cylinder units communicates through a screen 74 directly with the oil supply in the container 10, and each of the two other inlet valves communicates through a cap 65 and a suction conduit 76, which conduit can itself contain or open through a screen, with a sump region of the oil supply container at the side thereof adjacent to the screen 74 of the first-mentioned piston and cylinder unit. Accordingly, as the apparatus is viewed in FIG. 1 and FIG. 2, each of the units 54 takes in oil by suction from a region inside the oil supply container adjacent to the left-hand side thereof.

Figure 1:
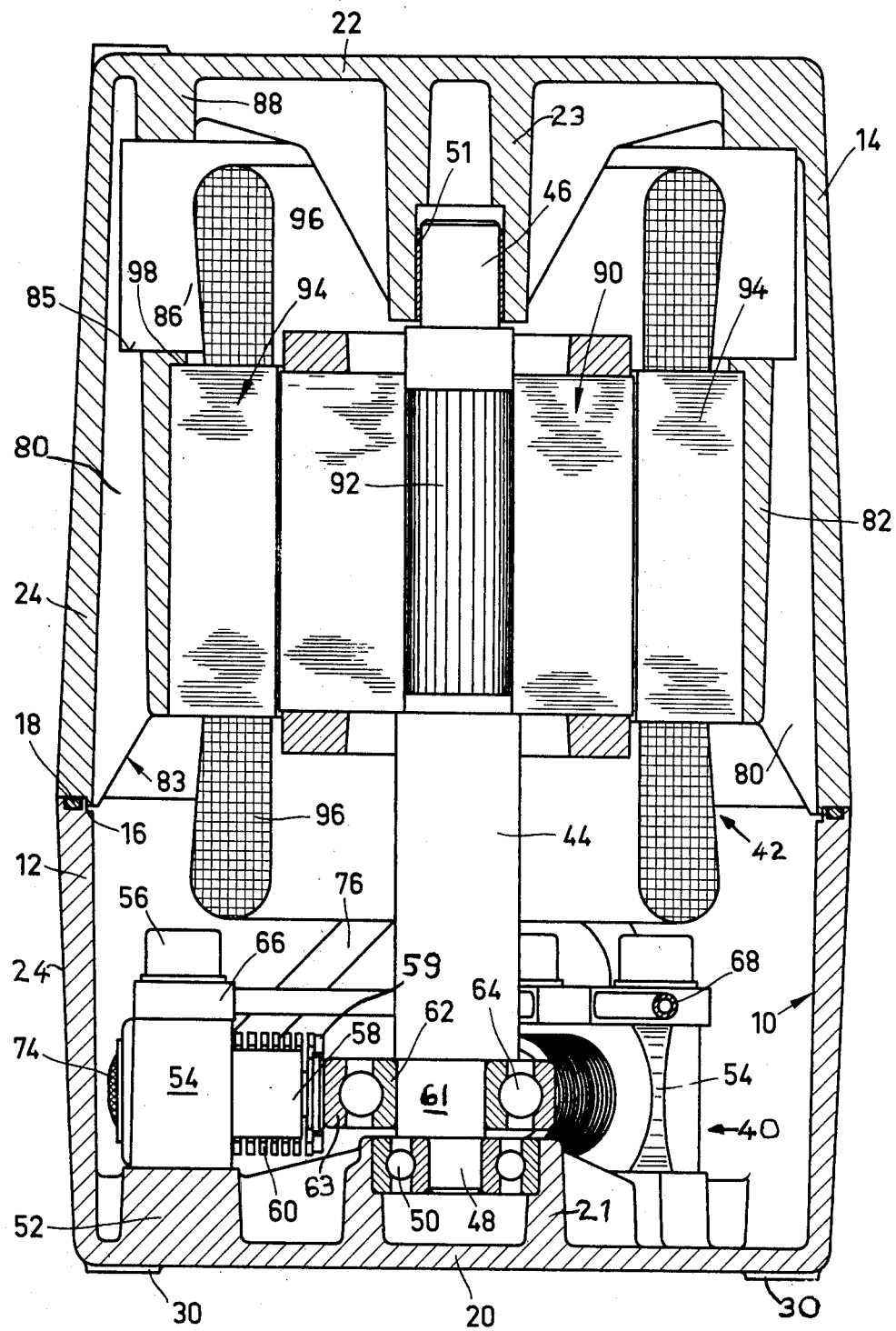
FIG. 1 is an axial vertical cross-sectional view of a pressure oil pump according to a preferred embodiment of the invention.

The sectional view in the upper region of FIG. 1, for better illustration, extends at the right-hand side thereof radially through one corner of the container, forming an angle of 45° with the section at the left-hand side which lies at a location between corners.

A plurality of ribs 80, for instance, eight of them, project radially inward from the side wall 24 of the upper shell 14 and are spaced apart about its inner periphery so as to hold in a fixed position inside the container wall, at a spacing from it, a circular ring 82 for holdng the electric motor 40 in working position. The spaces between the ribs 80 and between the ring 82 and side wall 24 constitute passageways 83 through which oil can flow in free communication both above and below with the oil supply held in the sump, or reservoir, provided inside the container. As they are shown in FIG. 1, the ribs 80 extend from the lower edge of the upper shell 14 over approximately two-thirds of the height of that shell and hold the ring 82 in a position offset slightly upwards relative to the mating edge surfaces of the two shells.

The shells 12 and 14 can be made, for instance, as pressure die castings, or by the sand casting method. In the former case, the ring 82 is cast as an annular downward projection from the end wall 22, or cover, of the upper shell 14, and a section of this projection is cut out in the region 86 above ring 82, leaving fragments 88 still protruding downwardly from wall 22. When the sand casting method is used, which is the procedure preferred for present purposes, the ribs and the holding ring can be produced readily in the desired form together with the wall forming the shell. In this case the holding ring, ribs and shell wall are made in one piece. The lower shell 12 with its supports 52 and sleeve-like extension 21 is also cast in one piece.

The electric motor 42 comprises a rotor 90 whose lamination assembly is held with a force fit in the usual way by splines 92 on the driving shaft 44. The stator 94 surrounding the rotor has overhanging coil ends 96, as also shown in FIG. 1, and has its lamination assembly secured in place by being force-fitted in the holding ring 82. The axial position of the stator is limited by abutment of its body against an upper shoulder 98 on the holding ring.

It will be understood that the lamination assemblies and the windings of the electric motor are disposed freely in the space within the oil supply container, with sufficient clearance from its wall structures so that the oil in the container can flow not only around and against these working parts of the motor but also between them so as to pass through the motor. A positive flow of the oil against and through the motor can be assured by delivering back into the container, as through the filling aperture 34, oil that is continually pumped from the sump, or oil supply, in the container and is passed back through the usual pressure return line (not shown).

The force fitting of the lamination assembly of the stator 94 in the holding ring 82 can be effected, for example, by a hot shrinking method. The same applies to the securing of the laminations of the rotor on the driving shaft 44. Since this single shaft provides the driving connection for the entire pump assembly, without even requiring a coupling, the electric motor and pump components of the pressure oil pump herein disclosed according to the invention constitute a unit having very few parts and to some extent having multiple functions.

Instead of the stator of the motor being held in a ring spaced away from the container side wall by ribs, the stator may be held by a ring or other support means fixed directly to or formed integrally with the container side wall at locations where that wall lies substantially tangent to the laminations of the stator. In this way, the oil container can be given the smallest polygonal outline, preferably a substantially square outline, that can encompass the stator, and passageways for the circulation of oil about and through the motor are provided in the corner regions of the container disposed laterally at either side of the stator fastening locations.

Instead of mounting the electric motor in the oil supply container by a force fit, any other retaining method can be employed within the basic principles of the invention.

It is to be noted that, according to this invention, the pre-existing need to provide a special housing for the electric motor is completely eliminated. The motor parts in which heat develops are freely exposed to the action of the oil in the oil supply container, instead of being acted upon through openings in a housing. By suitably guiding the oil flow in the oil supply container, the cooling action can be further enhanced.

While the invention has been exemplified by an embodiment thereof making use of a single radial piston pump, it is to be understood that other forms of hydraulic pressure pumps, including vane pumps, gear pumps and screw pumps, may also be utilized according to the invention.

What is claimed is:

1. A pressure fluid pump comprising a container formed by end walls and a peripheral side wall defining a single fluid-tight chamber for holding a supply of liquid to be pumped under pressure, a pump assembly mounted inside said chamber and including therein a pump, a member rotatable for driving said pump, liquid inlet means leading into said pump from a location to be immersed in liquid of said supply and outlet means extending from said pump through one of said walls for conducting out of said container liquid under the pressure of said pump; a rotary electric motor mounted inside said chamber and having its rotor connected with said rotatable member for driving said pump, and means connected to said side wall for supporting the stator of said motor with the windings thereof protruding free into the space in said chamber, said side wall and said supporting means defining therebetween passageways along said side wall through which liquid of said supply will pass freely so as to flow about and cool said motor.

2. A pump according to claim 1, said supporting means including a holding ring on the stator of said motor and means securing said ring to portions of said side wall at locations spaced apart peripherally about said ring, thereby forming said passageways for said fluid at the outer periphery of said ring.

3. A pump according to claim 2, said holding ring being connected to said wall portions by ribs spaced apart about the periphery of said ring, leaving said passageways between said ribs.

4. A pump according to claim 2, said holding ring being formed integrally in one piece with said container wall portions.

5. A pump according to claim 1, said side wall defining a polygon, said supporting means including means securing the stator of said motor to regions of said side wall lying nearly tangent to and spaced apart about said stator, thereby leaving said passageways in corner regions of the container between said wall regions.

6. A pump according to claim 5, said polygon being substantially a square.

7. A pump according to claim 5, said polygon being substantially a square and said securing means comprising a stator holding ring fixed at its outer periphery to a mid-region of each side of the square.

8. A pump according to claim 1, said container comprising a first shell supporting said pump assembly and a second shell mating with and sealed to said first shell and supporting said electric motor.

9. A pump according to claim 1, said rotor of and said rotatable member of said pump assembly being interconnected by a common shaft.

10. A pump according to claim 9, said pump being a single-row radial piston pump.

11. A pump according to claim 9, said shaft being mounted at its opposite ends in bearings supported respectively on portions of said end walls of said container.

12. A pump according to claim 11, the bearing mounting one end of said shaft being a thrust bearing and the bearing mounting the other end thereof being a radial bearing.

13. A pressure oil pump comprising two mating cup-shaped shells joined and sealed together one upon the other at their meeting edges and constituting a container for holding a supply of oil to be pumped under pressure, each said shell being a casting comprising an end wall and a side wall of polygonal form whereby the cross-sectional outline of the container is substantially square, a radial piston pump supported in the lower of said shells and comprising a plurality of radial piston and cylinder units spaced apart about a common axis, said units being mounted on support seats protruding from the end wall of said lower shell, a rotary electric motor supported in the upper of said shells for driving said pump, said upper shell having formed integrally thereinside a ring secured at peripherally spaced locations to its side wall so that passageways remain for oil to flow freely between its side wall and said ring, said ring holding the stator laminations of said motor therein by a force fit with the windings of said motor protruding free above and below said ring into the space in said container, and a rotary driving shaft mounted inside said container coaxially with said piston pump and said motor, the rotor of said motor being mounted on an upper portion of said shaft and a lower portion of said shaft having means thereon for sequentially displacing the pistons of said pump units as said shaft is rotated by said motor, each of said end walls having a bearing support protruding centrally therefrom and which contains a bearing supporting an end of said shaft.

14. A pump according to claim 13, the bearing in said bearing support on the lower shell being a thrust ball bearing unit and the bearing in said bearing support on the upper shell being a radial bearing.

15. A pump according to claim 13, said pump units having respective pressure outlet valves which are connected one to another by oil pressure pipes and from at least one of which an oil pressure line extends through said upper shell to deliver oil from said contnainer under pressure.

16. A pump according to claim 13, said pump units having respective oil intake valves at least one of which is located near a side of said square outline and the others of which have suction ducts connected therewith and extending to oil intakes opening near said side, so that the pressure oil pump is operable with said container either in the upright position or lying on said side.

17. A pump according to claim 13, the end wall of said upper shell having a normally sealed port therein for admitting oil into the space in said container.

* * * * *